x`

United States Patent
Lin et al.

(10) Patent No.: US 10,281,961 B1
(45) Date of Patent: May 7, 2019

(54) HARD DRIVE TRAY FACILITATING REMOVAL AND INSTALLATION

(71) Applicant: ZT Group Int'l, Inc., Secaucus, NJ (US)

(72) Inventors: Ting Yu Lin, Bloomfield, NJ (US); Chen An, Bogota, NJ (US)

(73) Assignee: ZT Group Int'l, Inc., Secaucus, NJ (US)

( * ) Notice: Subject to any disclaimer, the term of this patent is extended or adjusted under 35 U.S.C. 154(b) by 0 days.

(21) Appl. No.: 15/264,241

(22) Filed: Sep. 13, 2016

(51) Int. Cl.
*G06F 1/18* (2006.01)
*G11B 33/12* (2006.01)

(52) U.S. Cl.
CPC ............ *G06F 1/187* (2013.01); *G11B 33/124* (2013.01)

(58) Field of Classification Search
CPC ..... G06F 1/187; G11B 33/124; G11B 33/128; G11B 33/08
See application file for complete search history.

(56) References Cited

U.S. PATENT DOCUMENTS

| | | | | |
|---|---|---|---|---|
| 5,682,291 A * | 10/1997 | Jeffries | ................... | G06F 1/184 312/223.2 |
| 5,943,208 A * | 8/1999 | Kato | ....................... | G06F 1/184 248/222.11 |
| 6,075,695 A * | 6/2000 | Konno | .................... | G11B 33/08 361/679.31 |
| 6,094,342 A * | 7/2000 | Dague | ..................... | G06F 1/184 312/333 |
| 6,292,359 B1 * | 9/2001 | Boe | ......................... | G06F 1/184 312/333 |
| 6,525,933 B2 * | 2/2003 | Eland | ...................... | G06F 1/184 361/679.42 |
| 6,590,848 B1 * | 7/2003 | Chen | ..................... | G11B 33/128 174/350 |
| 7,495,904 B2 * | 2/2009 | Liang | ..................... | G06F 1/187 361/679.39 |
| 7,729,112 B2 * | 6/2010 | Atkins | ................... | G11B 33/12 211/26 |
| 8,009,416 B2 * | 8/2011 | Kang | ...................... | G06F 1/187 312/223.1 |
| 9,030,814 B2 * | 5/2015 | Tsai | ....................... | G11B 33/00 312/223.1 |
| 2004/0105229 A1 * | 6/2004 | Wang | ..................... | G06F 1/184 361/679.33 |
| 2005/0088778 A1 * | 4/2005 | Chen | ...................... | G06F 1/184 360/97.19 |
| 2009/0073649 A1 * | 3/2009 | Ikeda | .................. | G11B 33/124 361/679.35 |
| 2010/0103607 A1 * | 4/2010 | Chen | ...................... | G11B 33/08 361/679.36 |
| 2015/0083676 A1 * | 3/2015 | Peng | ....................... | G06F 1/187 211/41.12 |

* cited by examiner

*Primary Examiner* — James Wu
(74) *Attorney, Agent, or Firm* — Dergosits & Noah LLP; Todd A. Noah

(57) ABSTRACT

A carrier for securing a computer drive within a chassis facilitates the removal and installation of the computer drive in the carrier by using pins to engage the mounting holes of a computer drive.

9 Claims, 7 Drawing Sheets

HARD DRIVE TRAY FACILITATING REMOVAL AND INSTALLATION

BACKGROUND

In data centers, servers with hot-swappable hard disk drives (HDDs) are common and widely used. A carrier may be used to secure an HDD within the server (or a computer) chassis, preventing movement of the HDD. HDDs vary in dimension, with 3.5", 2.5", and 1.8" being common, but 8" drives and 5.25" drives have also been common.

Figure 1:
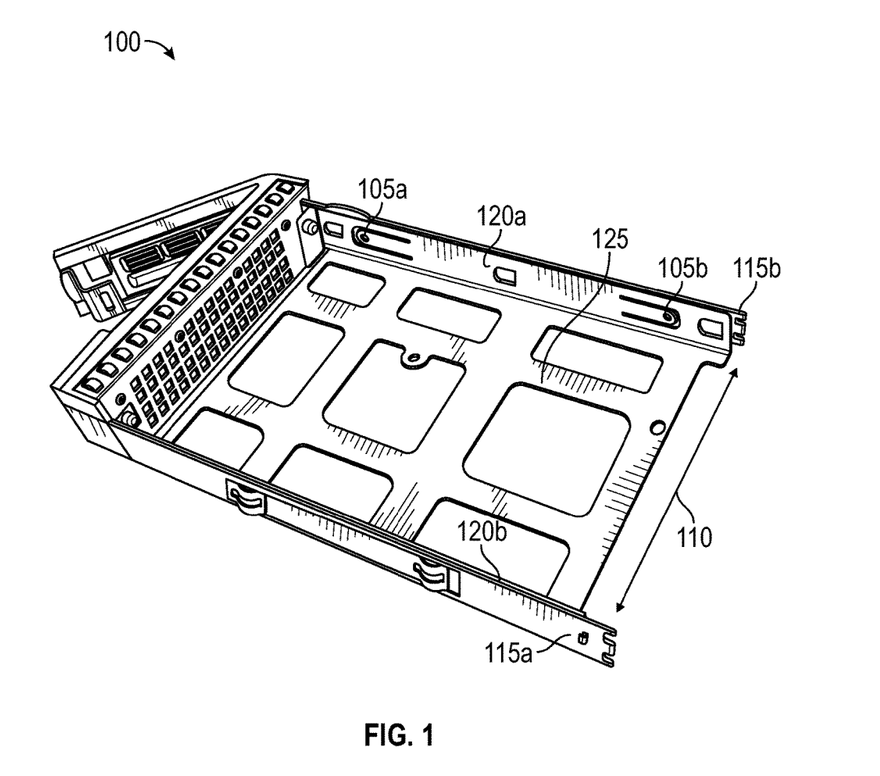
FIG. 1 is a perspective drawing illustrating a typical carrier.

FIG. 1 depicts a typical HDD carrier 100 where the HDD is intended to be mounted in the carrier using screws through screw holes 105a, 105b, 105c (not shown), 105d (not shown). To facilitate the smooth engagement of the HDD to the backplane, guides or plastic bars 115a and 115b may be added to each side 120a (not shown), 120b, with spacing 110 maintained by a grid 125.

But the use of screws increases the time required for the manual installation and removal of an HDD within a carrier—reducing the efficiency of technicians at a data center or a manufacturing operation. Also, plastic bars 115a and 115b and grid 125 can reduce the open area along the side and bottom of the HDD and decrease the air flow cooling the HDD and other server components.

Therefore, the need exists for a carrier that provides for a faster HDD attachment and removal and that promotes air flow to and around the HDD.

DETAILED DESCRIPTION

In an embodiment, a carrier for holding a computer drive facilitates the removal and installation of the computer drive in the carrier by using pins to engage the HDD rather than screws. In the embodiment, the carrier has a frame for receiving an HDD between two rails. As an HDD is lowered into the carrier, it moves toward flanges along the bottom of each rail. A bottom set of pins in the flanges engages HDD holes on the bottom of the HDD, which may have threads initially intended to receive mounting screws. With the HDD resting on the flanges, or on the bottom set of pins in the flanges, or on a combination of both, a side set of pins engages the HDD on each side of the HDD. The bottom set of pins thus prevents movement of the HDD in a plane defined by the base of the HDD, that is, parallel to the flanges. And the side set of pins thus prevents movement of the HDD perpendicular to the defined plane. By constraining the movement of the HDD in this way, the two sets of pins retain the HDD within the carrier. The embodiment facilitates the removal and installation of the computer drive in the carrier by using pins to engage the mounting holes of a computer drive.

In an embodiment, each pin of the side set of pins is attached to a tongue, with each tongue being attached in turn to a rail. Each tongue may bend from a first, engaged position to a second, disengaged position. In the first position, the pin on the tongue may engage a corresponding hole in an HDD. In the second, disengaged position, the pin on the tongue is moved away from the side of the HDD, preventing the pin from engaging the HDD. In an embodiment, the tongue is made of spring steel and moves from the disengaged position to the engaged position when released from the disengaged position. In an embodiment, the pins are extrusions. In an embodiment, the extrusions are of the tongue (for the side set of pins), or of the flange (for the bottom set of pins).

In an embodiment, the HDD is received in a carrier between rails that are joined at one end by an end piece, but the rails are not joined at the opposing end by another end piece. In other words, the carrier may be bounded on three, but not four sides of the HDD. In the embodiment, the two sets of pins retain the HDD within the rails as previously described, and the retained HDD provides rigidity to the carrier by adding connecting structure between the two rails. The embodiment improves heat transfer by employing the computer drive as a structural element of the carrier and correspondingly reducing the surface area of the carrier that is in contact with the computer drive.

In an embodiment, the HDD is received in a carrier between rails that are joined at one end by an end piece and at the opposing end by a second end piece. In the embodiment, the two end pieces and two rails define a plane parallel to the base of the HDD, and create a structure that prevents the HDD from moving within that plane. In the embodiment, a side set of pins in the rails engages the HDD on each side of the HDD and prevents movement of the HDD perpendicular to the defined plane. By constraining the movement of the HDD in this way, the carrier and the one set of side pins retain the HDD within the carrier.

In an embodiment, the HDD is received between rails that are minimized in area to promote airflow to the HDD and to promote airflow around the HDD. That is, cooling airflow is improved by reducing the sheet metal or plastic covering the side of an HDD, which results in cost savings due to the improved thermal performance reducing the fan power needed.

Figure 2A:
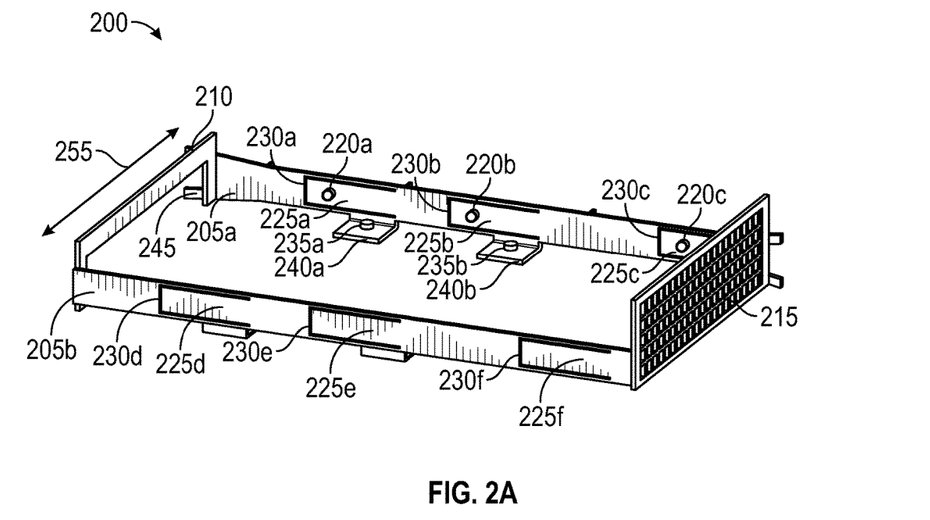
FIG. 2A is a perspective drawing illustrating an embodiment.
Figure 2B:
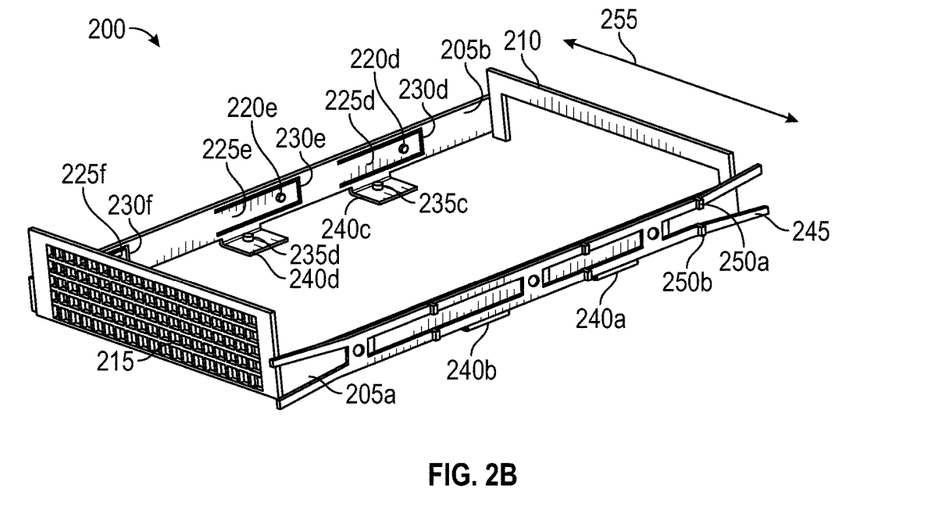
FIG. 2B is a perspective drawing illustrating an embodiment.

Aspects of the various embodiments will now be discussed with reference to the figures. FIGS. 2a and 2b are perspective drawings illustrating an embodiment of a carrier 200. In FIG. 2A, carrier 200 includes a front piece 215 joining side rails 205a, 205b at one end. A rear piece 210 joins side rails 205a, 205b at the opposing end. Rear piece 210 may be configured so that is does not interfere with an HDD mounting to a back plane.

Side rail 205a includes tongues 225a, 225b, 225c, which are defined within side rail 205a by slots 230a, 230b, 230c, respectively. Pins 220a, 220b, 220c are mounted on tongues 225a, 225b, 225c, respectively. Side rail 205a further includes flanges 240a, 240b, which are oriented perpendicularly to tongues 225a, 225b, 225c. Pins 235a, 235b are mounted on flanges 240a, 240b, respectively.

Similarly, side rail 205b includes tongues 225d, 225e, 225f, which are defined within side rail 205b by slots 230d, 230e, 230f, respectively. Pins 220d, 220e, 220f are mounted on tongues 225d, 225e, 225f, respectively. Side rail 205b further includes flanges 240c, 240d, which are oriented perpendicularly to tongues 225d, 225e, 225f. Pins 235c, 235d (FIG. 2B) are mounted on flanges 240c, 240d, respectively.

Side rail 205b further includes a plastic ladder 245, which may be retained by fingers, e.g., fingers 250a, 250b. An HDD may have an LED that indicates conditions, such as "power on," "transferring data," or "issue." Ladder 245 is for making that LED light visible outside of the chassis.

An HDD (not shown) may be mounted within carrier 200 in the space defined by front piece 215, rear piece 210, and side rails 205a, 205b. In the embodiment, to mount the HDD to carrier 200, tongues 225a-225f may be manually retracted, pulling side pins 220a-220f with them. The HDD may then be placed above the defined space and lowered to engage or accept lower pins 235a-235d within defined holes or other cavities within the HDD. Carrier 200 may rest on pins 235a-235d, or carrier 200 may engage pins 235a-235d, but rest on flanges 240a-240d. Once the HDD is positioned properly with respect to pins 235a-235d, then tongues 225a-225f may be allowed to deploy side pins 220a-220f so that side pins engage or are accepted by holes or other defined cavities within the HDD. Thus, lower pins 235a-235d engage the HDD and limit movement of the HDD parallel to a plane defined by flanges 240a-240d. And side pins 220a-220f engage the HDD and limit movement of the HDD perpendicular to that plane. Absent the HDD, side rails 205a, 205b are constrained in their movement by rear piece 210 and, for example, are not free to move in a direction 255. In other embodiments, the relative angles of the side pins, lower pins, flanges, and side rails may be varied with the same effect of retaining the HDD and limiting movement of the HDD.

In an embodiment, tongues 225a-225f may have a spring nature that causes them to resist being retracted. The spring nature also causes them to return to position and deploy side pins 220a-220f upon being released. In an embodiment, tongues 225a-225f are deformable and retain a position in which they are set. In an embodiment, tongues 225a-225f are mounted by hinges that have detents in engaged (closed) and disengaged (open) positions.

In an embodiment, pins 220a-220f and pins 235a-235d are substantially cylindrical and configured to engage holes in an HDD, e.g., holes for mounting screws. In an embodiment, pins 220a-220f and pins 235a-235d may be other geometries, such as teeth, or mounds, that are configured to engage an HDD. In embodiments, the pins may be individual elements that are assembled to carrier 200, or may be extrusions of carrier 200, or may be attached in other ways. In embodiments, the shape of pins 220a-220f may be modified to account for the yaw each pin undergoes as it moves at the end of a moving tongue 225a-225f, where such movement may result in the pin not aligning exactly with a hole in an HDD.

In an embodiment, pins 220a-220f may have a tooth or ramp shape that allows an HDD to be "snapped" into place in carrier 200. In the embodiment, pins 220a-220f may have a ramp shape so that as an HDD is lowered down toward pins 235a-235d, the sides of the HDD encounter an initial ramp section of pins 220a-220f. As the HDD is lowered further, the increasing ramp profile causes pins 220a-220f to be forced away from the HDD, with tongues 225a-225f bending to accommodate the movement. Upon the HDD achieving the correct position with respect to pins 235a-235d (or with respect to flanges 240a-240d), the HDD passes the high points of the ramp sections of pins 220a-220f, i.e., pins 220a-220f are aligned with holes in the HDD. Then tongues 225a-225f may be urged to move pins 220a-220f into the HDD holes. Where tongues 225a-225f have a spring quality, they may "automatically" urge pins 220a-220f into holes 225a-225f when the HDD achieves the correct position. Thus, the tooth profiles of side pins 220a-220f then engage the HDD and prevent or severely hinder movement of the HDD in the opposite direction, i.e., away from flanges 240a-240d. In the embodiment, the HDD may be released from carrier 200 by withdrawing tongues 225a-225f, which in turn causes pins 220a-220f to disengage from the HDD. The HDD may then be raised and disengaged from lower pins 235a-235d.

In an embodiment, pins 235a-235d may have a similar tooth or ramp shape that allows an HDD to be "snapped" into place in carrier 200. And, in an embodiment, flanges 240a-240d may have a spring nature like that discussed with reference to tongues 225a-225f.

Figure 3A:
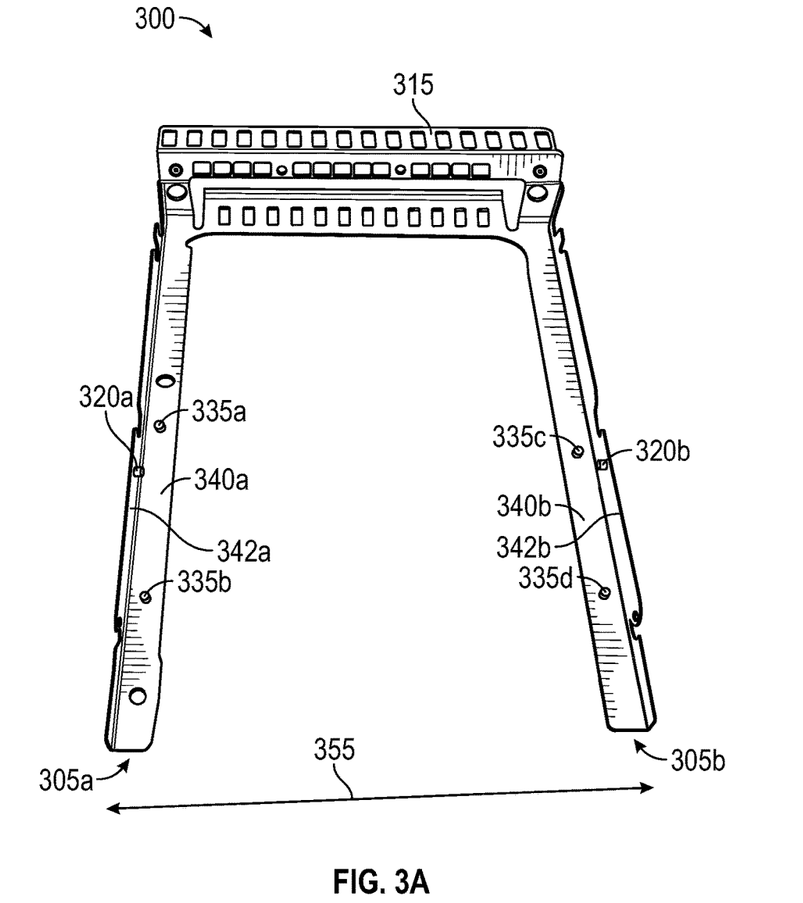
FIG. 3A is a perspective drawing illustrating an embodiment.

FIG. 3A is a perspective drawing illustrating an embodiment of a carrier 300. In FIG. 3A, carrier 300 includes a front piece 315 joining side rails 305a, 305b at one end. Side rail 305b includes a lower flange 340b and a side flange 342b. Side rail 305a includes a lower flange 340a and a side flange 342a. Carrier 300 has no rear piece. Side rails 305a, 305b include side pins 320a, 320b, which may be pins on or extrusions of flanges 342a, 342b. Side rails 305a, 305b include bottom pins 335a-335d which are pins on or extrusions of the bottom of side rails 305a or 305b. Side rails 305a, 305b may be made of a material with an elastic property that allows the rail to flex or deform under force and return to the original shape when the force is removed, such as a spring steel.

An HDD (not shown) may be mounted within carrier 300 in the space defined by front piece 315 and side rails 305a, 305b. In the embodiment, to mount the HDD to carrier 300 the HDD is placed above the defined space and lowered to rest upon bottom pins 335a-335d. At an initial point, bottom pins 335a-335d may not be in alignment with corresponding holes in the HDD. Also at an initial point, side pins 320a, 320b may also not be in alignment with corresponding holes in the HDD. Side rails 305a, 305b may then be urged against the HDD, forcing the HDD further into the corner between flanges 340a and 342a, and further into the corner between flanges 340b and 342b. The resulting movement eventually causes side pins 320a, 320b to align with holes in the HDD, and causes bottom pins 335a-335d to align with holes in the HDD. Once aligned, the pins move into and engage the corresponding holes or other cavities within the HDD. Depending on the relative lengths of the pins and HDD holes, carrier 300 may rest on pins 335a-335d, or carrier 300 may engage pins 335a-335d, but rest on or otherwise be supported by lower flanges 340a, 340b. In an embodiment, side rails 305a, 305b may have a spring nature that causes them to resist being deformed. The spring nature also causes them to return to position once a deforming force is removed.

Figure 3B:
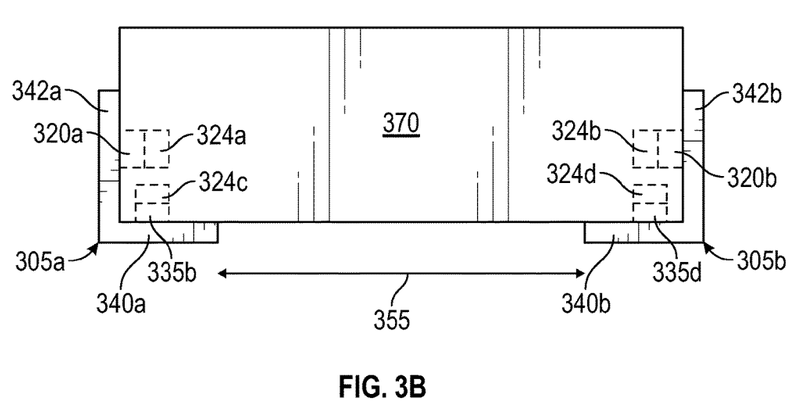
FIG. 3B is an end-view drawing illustrating an embodiment.

FIG. 3B is an end-view drawing illustrating an embodiment for retaining an HDD 370 by carrier 300. In the embodiment of FIG. 3B, side pins 320a, 320b are shown engaging holes 324a, 324b, respectively, in HDD 370. Bottom pins 335b, 335d are shown engaging holes 324c, 324d, respectively (for clarity, bottom pins 335a, 335c are not shown). Pins 320a, 320b and pins 335a-335d are cylindrical and holes 324a-324d are also cylindrical, and may be existing HDD holes for mounting screws. Side pins 320a, 320b and bottom pins 335a-335d may be oriented as shown so that forces generated by side pins 320a, 320b engaging HDD 370 cooperate with forces generated by bottom pins 335a-335d engaging HDD 370 to retain HDD 370 against the side rails. For example, HDD 370 as shown engaged by side pin 320a and bottom pins 335a, 335b will be retained by side rail 305a. Similarly, HDD 370 as shown engaged by side pin 320b and bottom pins 335c, 335d will be retained by side rail 305b. With HDD 370 so retained by side rails 305a, 305b, the side rails are constrained in their movement by the structure of HDD 370. For example, side rails 305a, 305b are not free to move in direction 355. In this manner, HDD 370 supports side rails 305a, 305b, making grid 125 (FIG. 1) optional and rear pieces 210 (FIG. 2), 410 (FIG. 4), 510 (FIG. 5), and 610 (FIG. 6) also optional. The ability to remove grid 125 and the rear pieces allows for reduced manufacturing costs, both in reduced material and reduced material processing costs. The removal of grid 125 and the rear pieces may also improve the airflow past and through an HDD mounted to carrier 300.

In an embodiment, pins 320a, 320b and pins 335a-335d may be other geometries, such as teeth, or mounds, that are configured to engage mounting holes or other openings in HDD 370.

Figure 3C:
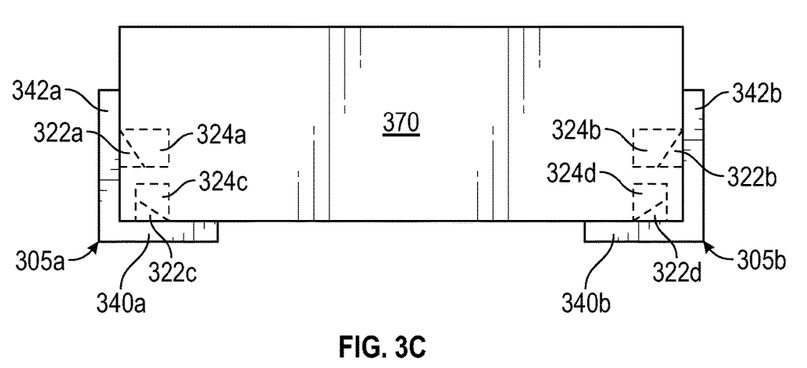
FIG. 3C is an end-view drawing illustrating an embodiment.

FIG. 3C is an end-view drawing illustrating an embodiment for retaining HDD 370 by carrier 300. In the embodiment, side rail 305a has side pin 322a and bottom pin 322c and side rail 305b has side pin 322b and bottom pin 322d. Pins 322a-322d have a ramp shape in profile (shown) and a base that may be otherwise, e.g., circular or rectangular. In the embodiment, side pins 322a, 322b are shown engaging holes 324a, 324b, respectively, in HDD 370. Bottom pins 322c, 322d are shown engaging holes 324c, 324d, respectively. With HDD 370 in position and engaged, side pins 322a, 322b contact the lower sides of holes 324a, 324b-holding HDD 370 against flanges 340a, 340b, respectively. Similarly, lower pins 322c, 322d contact the "outer" sides of holes 324c, 324d, holding HDD 370 against flanges 342a, 342b, respectively.

Side pins 322a, 322b and bottom pins 322c, 322d may be oriented as shown so that forces generated by side pins 322a, 322b engaging an HDD 370 cooperate with forces generated by bottom pins 322c, 322d engaging HDD 370 to retain HDD 370 against the side rails. For example, HDD 370 as shown engaged by side pin 322a and bottom pin 322c will be retained by side rail 305a. Similarly, HDD 370 as shown engaged by side pin 322b and bottom pins 322d will be retained by side rail 305b. As discussed above, with HDD 370 so retained by side rails 305a, 305b, the side rails are constrained in their movement by the structure of HDD 370.

In an embodiment, the ramp shape of pins 322a-322d may allow HDD 370 to be "snapped" into place in carrier 300. In the embodiment, as HDD 370 is lowered down toward pins 322a-322d, the sides of HDD 370 encounter the initial ramp section of pins 322a, 322b. As HDD 370 is lowered further, the increasing ramp profile causes pins 322a, 322b to be forced away from HDD 370, with flanges 342a, 342b bending to accommodate the movement. Upon HDD 370 achieving the correct position (with respect to pins 322a-322d, or with respect to flanges 340a, 340b, 342a, 342b), holes 324a-324d pass the high points of the ramp sections of pins 322a-322d, i.e., pins 322a-322d become aligned with holes 324a-324d and pins 322a-322d may be urged into holes 324a-324d. Where flanges 340a, 340b, 342a, 342b (or tongues 225a-225f of FIG. 2) have a spring quality, they may "automatically" urge pins 322a-322d into holes 324a-324d when HDD 370 achieves the correct position. Thus, the tooth profiles of pins 322a-322d then engage HDD 370 and prevent or severely hinder movement of the HDD in the opposite direction, i.e., away from flanges 340a, 340b, 342a, 342b. In the embodiment, HDD 370 may be released from carrier 300 by withdrawing flanges 340a, 340b (or tongues 225a-225f from carrier 200 of FIG. 2) which in turn causes pins 322a, 322b (or pins 220a-220f of FIG. 2) to disengage from HDD 370. HDD 370 may then be raised and disengaged from lower pins 322c, 322d.

Figure 4:
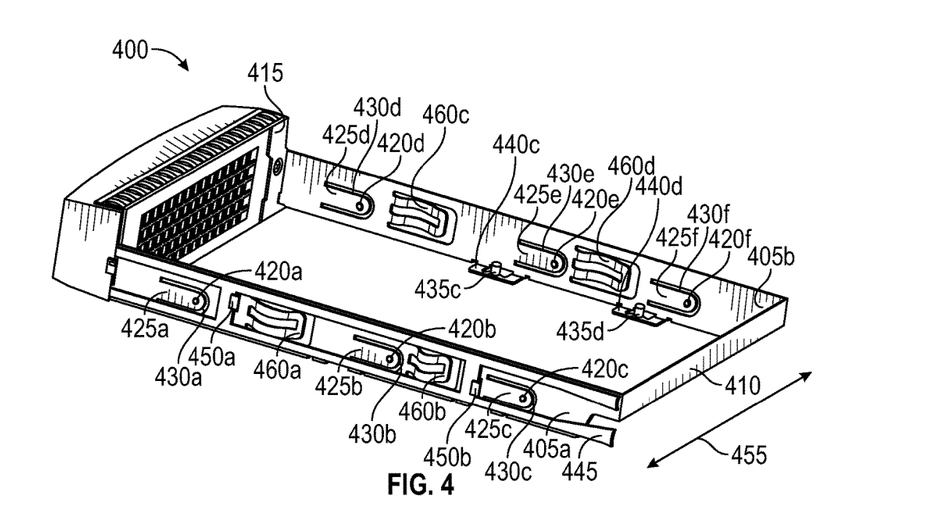
FIG. 4 is a perspective drawing illustrating an embodiment.

FIG. 4 is a perspective drawing illustrating an embodiment of a carrier 400. In FIG. 4, carrier 400 includes a front piece 415 joining side rails 405a, 405b at one end. A rear piece 410 joins side rails 405a, 405b at the opposing end. Rear piece 410 may be configured so that it does not interfere with an HDD mounting to a back plane.

Side rail 405b includes tongues 425d, 425e, 425f, which are defined within side rail 405b by slots 430d, 430e, 430f, respectively. Pins 420d, 420e, 420f are mounted on tongues 425d, 425e, 425f, respectively. Side rail 405b further includes flanges 440c, 440d, which are oriented perpendicularly to tongues 425d, 425e, 425f. Pins 435c, 435d are mounted on flanges 440c, 440d, respectively. Side rail 405b also includes guides 460c, 460d, which may guide carrier 400 during installation by sliding along a rail in a computer chassis.

Similarly, side rail 405a includes tongues 425a, 425b, 425c, which are defined within side rail 405a by slots 430a, 430b, 430c, respectively. Pins 420a, 420b, 420c are mounted on tongues 425a, 425b, 425c, respectively in the same way pins 420d, 420e, 420f are mounted on tongues 425d, 425e, 425f. Pins 420a, 420b, 420c are visible from this perspective because, in this embodiment, they are extrusions and are visible from the concave side of the extrusion. Side rail 405a further includes flanges 440a, 440b (not visible from this perspective), which are oriented perpendicularly to tongues 425a, 425b, 425c. Pins 435a, 435b (not visible from this perspective) are mounted on flanges 440a, 440b, respectively.

Side rail 405a also includes guides 460a, 460b, which may guide carrier 400 during installation by sliding along a rail in a computer chassis. Side rail 405a further includes a plastic ladder 445, which may be retained by fingers 450a, 450b. An HDD may have an LED that indicating conditions, such as "power on," "transferring data," or "issue." Ladder 445 is for making that LED light visible outside of the chassis.

An HDD (not shown) may be mounted within carrier 400 in the space defined by front piece 415, rear piece 410, and side rails 405a, 405b. In the embodiment, to mount the HDD to carrier 400, tongues 425a-425f may be manually retracted, pulling side pins 420a-420f with them. The HDD may then be placed above the defined space and lowered to engage or accept lower pins 435a-435d within defined holes or other cavities within the HDD. Carrier 400 may rest on pins 435a-435d, or carrier 400 may engage pins 435a-435d, but rest on flanges 440a-440d. Once the HDD is positioned properly with respect to pins 435a-435d, then tongues 425a-425f may be allowed to deploy side pins 420a-420f so that the side pins engage or are accepted by holes or other defined cavities within the HDD. Absent the HDD, side rails 405a-405b are constrained in their movement by rear piece 410 and, for example, are not free to move in a direction 455. In an embodiment, tongues 425a-425f may have a spring nature that causes them to resist being retracted. The spring nature may also cause them to return to position upon being released and deploy side pins 420a-420f. In an embodiment, tongues 425a-425f are deformable and retain a position in which they are set. In an embodiment, tongues 425a-425f are mounted by hinges that have detents in the engaged (closed) and dis-engaged (open) positions.

In an embodiment, pins 420a-420f and pins 435a-435d are substantially cylindrical and configured to engage holes in an HDD, e.g., holes for mounting screws. In an embodiment, pins 420a-420f and pins 435a-435d may be other geometries, such as teeth, or mounds, that are configured to engage an HDD. In embodiments, the pins may be individual elements that are assembled to carrier 400, or may be extrusions of carrier 400, or may be attached in other ways. In the embodiment, the shape of pins 420a-420f may be modified to account for the yaw each pin undergoes as it moves at the end of a moving tongue 425a-425f.

In an embodiment, pins 420a-420f may have a tooth or ramp shape that allows an HDD to be "snapped" into place in carrier 400. In the embodiment, pins 420a-420f may have a ramp shape so that as an HDD is lowered down toward pins 435a-435d, the sides of the HDD encounter an initial ramp section of pins 420a-420f. As the HDD is lowered further, the increasing ramp profile causes pins 420a-420f to be forced away from the HDD, with tongues 425a-425f bending to accommodate the movement. Upon the HDD achieving the correct position with respect to pins 435a-435d (or with respect to flanges 440a-440d), pins 420a-420f align with holes in the HDD and tongues 425a-425f may be urged to move pins 420a-420f into the HDD holes. Where tongues 425a-425f have a spring quality, they may "automatically" urge pins 420a-420f into holes 425a-425f when the HDD achieves the correct position. Thus, the tooth profiles of side pins 420a-420f then engage the HDD and prevent or severely hinder movement of the HDD in the opposite direction, i.e., away from flanges 440a-440d. In the embodiment, the HDD may be released from carrier 400 by withdrawing tongues 425a-425f, which in turn causes pins 420a-420f to disengage from the HDD. The HDD may then be raised and disengaged from lower pins 435a-435d.

In an embodiment, pins 435a-435d may have a similar tooth or ramp shape that allows an HDD to be "snapped" into place in carrier 400. And, in an embodiment, flanges 440a-440d may have a spring nature like that discussed with reference to tongues 425a-425f.

The effect of the embodiment of FIG. 4 on the heat transfer of a system was tested. The results are reported in Table 1, below. In the test, the temperatures of various system components was noted, first using a typical HDD carrier such as that of FIG. 1, and then using the embodiment shown in FIG. 4. The results indicate a significant thermal improvement using the embodiment—every component tested operated at a lower temperature using the embodiment. The results also indicated that airflow through the system was significantly increased using the embodiment. These improvements may result in substantial energy cost savings.

TABLE 1

(in ° C.)

| Component Names | Typical HDD Carrier | HDD Carrier of FIG. 4 |
| --- | --- | --- |
| CPU Front | 74 | 71 |
| CPU 8K | 86 | 84 |
| CPU Front voltage regulator | 48.2 | 45.2 |
| CPU 8K voltage regulator | 55.9 | 53.4 |
| DIMM1 | 59.1 | 56.7 |
| DIMM2 | 62.0 | 60.5 |
| Northbridge | 41.9 | 39.7 |
| Southbridge heat sink | 50.1 | 47.2 |
| Power supply unit local ambient temperature | 49.1 | 43.8 |
| Hard drive power supply unit | 49.1 | 43.8 |
| Inlet | 23.1 | 23.1 |
| Air Flow Rate | 27.1 cfm | 30.9 cfm |

TABLE 1-continued

Note: Table header said "heat sink" spans across Southbridge/heat sink row.

Figure 5:
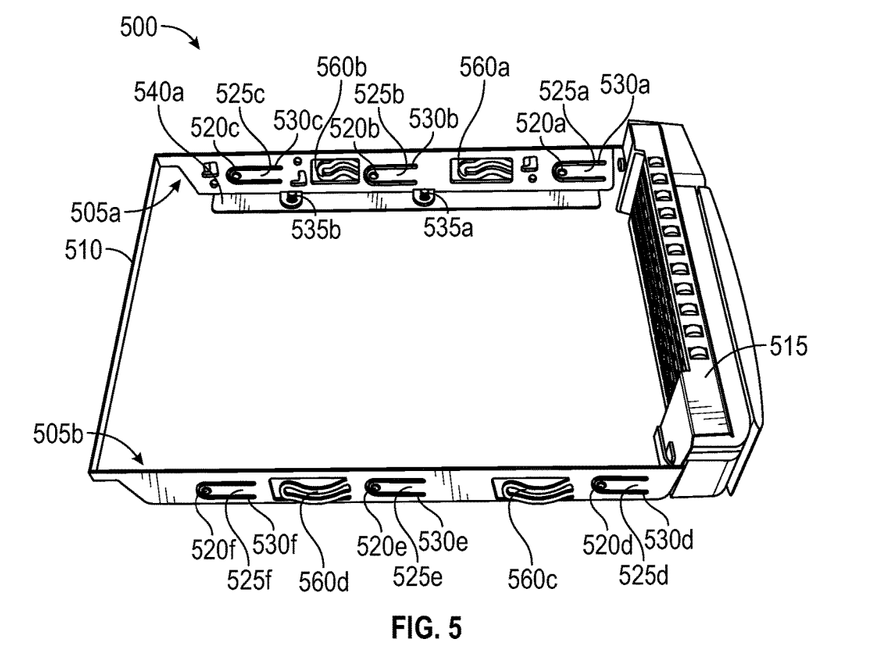
FIG. 5 is a perspective drawing illustrating an embodiment.

FIG. 5 is a perspective drawing illustrating an embodiment of a carrier 500. In FIG. 5, carrier 500 includes a front piece 515 joining side rails 505a, 505b at one end. A rear piece 510 joins side rails 505a, 505b at the opposing end. Rear piece 510 may be configured so that is does not interfere with an HDD mounting to a back plane.

Side rail 505a includes tongues 525a, 525b, 525c, which are defined within side rail 505a by slots 530a, 530b, 530c, respectively. Pins 520a, 520b, 520c are mounted on tongues 525a, 525b, 525c, respectively. Side rail 505a further includes flange 540a, which is oriented perpendicularly to tongues 525a, 525b, 525c. Pins 535a, 535b are mounted on flange 540a. In the embodiment, pins 535a, 535b are pins defined by cutting a tooth-shaped section in flange 540a and bending that section up, perpendicularly to flange 540a. Side rail 505a also includes guides 560a, 560b, which may guide carrier 500 during installation by sliding along a rail in a computer chassis.

Similarly, side rail 505b includes tongues 525d, 525e, 525f, which are defined within side rail 505b by slots 530d, 530e, 530f, respectively. Pins 520d, 520e, 520f are mounted on tongues 525d, 525e, 525f, respectively in the same way pins 520a, 520b, 520c are mounted on tongues 525a, 525b, 525c. Pins 520d, 520e, 520f are visible from this perspective because, in this embodiment, they are extrusions and are visible from the concave side of the extrusion. Side rail 505b further includes flange 540b (not visible from this perspective), which is oriented perpendicularly to tongues 525d, 525e, 525f. Pins 535c, 535d (not visible from this perspective) are mounted on flange 540b. In the embodiment, pins 535c, 535d are pins defined by cutting a tooth-shaped section in flange 540b and bending that section up, perpendicularly to flange 540b. Side rail 505b also includes guides 560c, 560d, which may guide carrier 500 during installation by sliding along a rail in a computer chassis.

An HDD (not shown) may be mounted within carrier 500 in the space defined by front piece 515, rear piece 510, and side rails 505a, 505b. In the embodiment, to mount the HDD to carrier 500, tongues 525a-525f may be manually retracted, pulling side pins 520a-520f with them. The HDD may then be placed above the defined space and lowered to engage or accept lower pins 535a-535d within defined holes or other cavities within the HDD. Carrier 500 may rest on pins 535a-535d, or carrier 500 may engage pins 535a-535d, but rest on flanges 540a-540d. Once the HDD is positioned properly with respect to pins 535a-535d, then tongues 525a-525f may be allowed to deploy side pins 520a-520f so that the side pins engage or are accepted by holes or other defined cavities within the HDD. In an embodiment, tongues 525a-525f may have a spring nature that causes them to resist being retracted. The spring nature may also cause them to return to position and deploy side pins 520a-520f upon being released. In an embodiment, tongues 525a-525f are deformable and retain a position in which they are set. In an embodiment, tongues 525a-525f are mounted by hinges that have detents in the engaged (closed) and dis-engaged (open) positions.

In an embodiment, pins 520a-520f and pins 535a-535d are substantially cylindrical and configured to engage holes in an HDD, e.g., holes for mounting screws. In an embodiment, pins 520a-520f and pins 535a-535d may be other geometries, such as teeth, or mounds, that are configured to engage an HDD. In embodiments, the pins may be individual elements that are assembled to carrier 500, or may be extrusions of carrier 500, or may be attached in other ways. In the embodiment, the shape of pins 520a-520f may be modified to account for the yaw each pin undergoes as it moves at the end of a moving tongue 525a-525f.

In an embodiment, pins 520a-520f may have a tooth or ramp shape that allows an HDD to be "snapped" into place in carrier 500. In the embodiment, pins 520a-520f may have a ramp shape so that as an HDD is lowered down toward pins 535a-535d, the sides of the HDD encounter an initial ramp section of pins 520a-520f. As the HDD is lowered further, the increasing ramp profile causes pins 520a-520f to be forced away from the HDD, with tongues 525a-525f bending to accommodate the movement. Upon the HDD achieving the correct position with respect to pins 535a-535d (or with respect to flanges 540a-540d), pins 520a-520f align with holes in the HDD and tongues 525a-525f may be urged to move pins 520a-520f into the HDD holes. Where tongues 525a-525f have a spring quality, they may "automatically" urge pins 520a-520f into holes 525a-525f when the HDD achieves the correct position. Thus, the tooth profiles of side pins 520a-520f then engage the HDD and prevent or severely hinder movement of the HDD in the opposite direction, i.e., away from flanges 540a-540d. In the embodiment, the HDD may be released from carrier 500 by withdrawing tongues 525a-525f, which in turn causes pins 520a-520f to disengage from the HDD. The HDD may then be raised and disengaged from lower pins 535a-535d.

In an embodiment, pins 535a-535d may have a similar tooth or ramp shape that allows an HDD to be "snapped" into place in carrier 500. And, in an embodiment, flanges 540a, 540b may have a spring nature like that discussed with reference to tongues 525a-525f.

Figure 6:
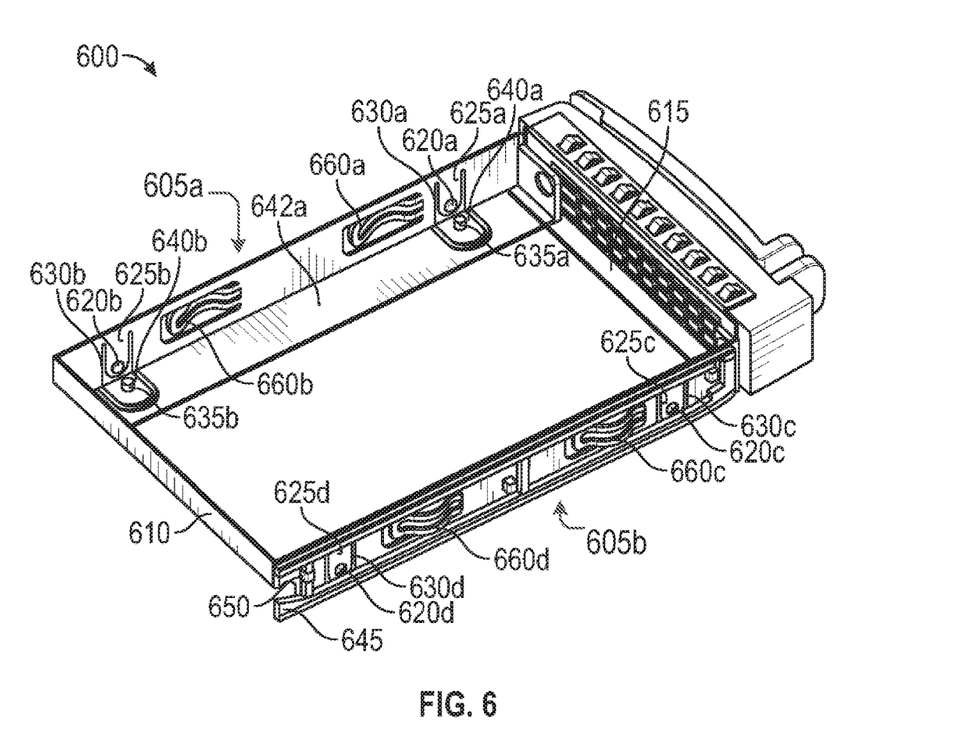
FIG. 6 is a perspective drawing illustrating an embodiment.

FIG. 6 is a perspective drawing illustrating an embodiment of a carrier 600. In FIG. 6, carrier 600 includes a front piece 615 joining side rails 605a, 605b at one end. A rear piece 610 joins side rails 605a, 605b at the opposing end. Rear piece 610 may be configured so that is does not interfere with an HDD mounting to a back plane.

Side rail 605a includes tongues 625a, 625b, which are defined within side rail 605a by slots 630a, 630b, respectively. Pins 620a, 620b are mounted on tongues 625a, 625b, respectively. Side rail 605a further includes flange 642a, which is oriented perpendicularly to tongues 625a, 625b. Pins 635a, 635b are mounted on raised sections 640a, 640b, respectively, of flange 642a. In an embodiment, pins 635a, 635b and raised sections 640a, 640b may be extrusions of flange 642a. Side rail 605a also includes guides 660a, 660b, which may guide carrier 600 during installation by sliding along a rail in a computer chassis.

Similarly, side rail 605b includes tongues 625c, 625d, which are defined within side rail 605b by slots 630c, 630d, respectively. Pins 620c, 620d are mounted on tongues 625c, 625d, respectively, in the same way pins 620a, 620b are mounted on tongues 625a, 625b. Pins 625c, 625d are visible from this perspective because, in this embodiment, they are extrusions and are visible from the concave side of the extrusion. Side rail 605b further includes flange 642b (not visible from this perspective), which is oriented perpendicularly to tongues 625c, 625d. Pins 635c, 635d (not visible from this perspective) are mounted on raised sections 640c, 640d, respectively, of flange 642b. In an embodiment, pins 635c, 635d and raised sections 640c, 640d may be extrusions of flange 642b. Side rail 605b also includes guides 660c, 660d, which may guide carrier 600 during installation by sliding along a rail in a computer chassis.

An HDD (not shown) may be mounted within carrier 600 in the space defined by front piece 615, rear piece 610, and side rails 605a, 605b. In the embodiment, to mount the HDD to carrier 600, tongues 625a-625d may be manually retracted, pulling side pins 620a-620d with them. The HDD may then be placed above the defined space and lowered to engage or accept lower pins 635a-635d within defined holes or other cavities within the HDD. Carrier 600 may rest on pins 635a-635d, or carrier 600 may engage pins 635a-635d, but rest on raised sections 640a-640d. Once the HDD is positioned properly with respect to pins 635a-635d, then tongues 625a-625d may be allowed to deploy side pins 620a-620d so that the side pins engage or are accepted by holes or other defined cavities within the HDD. Side rail 605b further includes a plastic ladder 645, which may be retained by a finger 650. In an embodiment, tongues 625a-625d may have a spring nature that causes them to resist being retracted. The spring nature may also cause them to return to position and deploy side pins 620a-620d upon being released. In an embodiment, tongues 625a-625d are deformable and retain a position in which they are set. In an embodiment, tongues 625a-625d are mounted by hinges that have detents in the engaged (closed) and disengaged (open) positions.

In an embodiment, pins 620a-620d and pins 635a-635d are substantially cylindrical and configured to engage holes in an HDD, e.g., holes for mounting screws. In an embodiment, pins 620a-620d and pins 635a-635d may be other geometries, such as teeth, or mounds, that are configured to engage an HDD. In embodiments, the pins may be individual elements that are assembled to carrier 600, or may be extrusions of carrier 600, or may be attached in other ways. In the embodiment, the shape of pins 620a-620d may be modified to account for the yaw each pin undergoes as it moves at the end of a moving tongue 625a-625d.

In an embodiment, pins 620a-620d may have a tooth or ramp shape that allows an HDD to be "snapped" into place in carrier 600. In the embodiment, pins 620a-620d may have a ramp shape so that as an HDD is lowered down toward pins 635a-635d, the sides of the HDD encounter an initial ramp section of pins 620a-620d. As the HDD is lowered further, the increasing ramp profile causes pins 620a-620d to be forced away from the HDD, with tongues 625a-625d bending to accommodate the movement. Upon the HDD achieving the correct position with respect to pins 635a-635d (or with respect to flanges 640a-640d), pins 620a-620d align with holes in the HDD and tongues 625a-625d may be urged to move pins 620a-620d into the HDD holes. Where tongues 625a-625d have a spring quality, they may "automatically" urge pins 620a-620d into holes in the HDD when the HDD achieves the correct position. Thus, the tooth profiles of side pins 620a-620d then engage the HDD and prevent or severely hinder movement of the HDD in the opposite direction, i.e., away from flanges 640a-640d. In the embodiment, the HDD may be released from carrier 600 by withdrawing tongues 625a-625d, which in turn causes pins 620a-620d to disengage from the HDD. The HDD may then be raised and disengaged from lower pins 635a-635d.

In an embodiment, pins 635a-635d may have a similar tooth or ramp shape that allows an HDD to be "snapped" into place in carrier 600. And, in an embodiment, flanges 640a, 640b may have a spring nature like that discussed with reference to tongues 625a-625d.

In an embodiment, elements engaging the HDD are raised sections, where the raised sections have ramp sections with a profile having a sloping side and a flat side, the flat side of the ramp sections urging the computer drive to limit movement of the computer drive.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. For example, one skilled in the art will recognize that these embodiments can be practiced without one or more of the specific details, or with other components, systems, etc. And, in other instances, there may be structures or operations not shown, or not described in detail, to avoid obscuring aspects of the described embodiments. Therefore, the scope of the appended claims should be accorded the broadest interpretation so as to encompass all such modifications and similar arrangements.

What is claimed is:

1. A carrier for holding a computer drive and facilitating the removal and installation of the computer drive in the carrier, the carrier comprising:
   a frame for receiving the computer drive, the frame defining a plane corresponding to a base of the computer drive and having a first side rail and a second side rail each cantilevered from a first end element, the first side rail having a first flange substantially parallel to the plane and a second flange substantially perpendicular to the plane, the second side rail having a third flange substantially parallel to the plane and a fourth flange substantially perpendicular to the plane;
   a first non-threaded engaging element disposed on the first flange of the first side rail, the first engaging element being configured to releasably engage the computer drive;
   a second non-threaded engaging element disposed on the second flange of the first side rail, the second engaging element being configured to releasably engage the computer drive;
   a third non-threaded engaging element disposed on the third flange of the second side rail, the third non-threaded engaging element being configured to releasably engage the computer drive; and
   a fourth non-threaded engaging element disposed on the second side rail, the fourth non-threaded engaging element being configured to releasably engage the computer drive;
   wherein each engaging element is a raised section on the respective flanges and has a ramp section with a profile having a sloping side and a flat side, the flat side of the ramp sections urging against interior surfaces of recesses of the computer drive.

2. The carrier of claim 1, the raised sections being extrusions of the respective flanges.

3. The carrier of claim 1, the raised sections being pins or cylinders on the respective flanges.

4. The carrier of claim 1, the ramp sections having a circular base.

5. The carrier of claim 1, the ramp sections having a rectangular base.

6. The carrier of claim 1, the second non-threaded engaging element being disposed on a first tongue of the first side rail, the first tongue being bendable to allow the second non-threaded engaging element to releasably engage the computer drive, and
   the fourth non-threaded engaging element being disposed on a second tongue of the second side rail, the second tongue being bendable to allow the fourth non-threaded engaging element to releasably engage the computer drive.

7. The carrier of claim 1, the second non-threaded engaging element being disposed on a first tongue of the first side rail, the first tongue being bendable to allow the second non-threaded engaging element to releasably engage the computer drive, and
   the fourth non-threaded engaging element being disposed on a second tongue of the second side rail, the second tongue being bendable to allow the fourth non-threaded engaging element to releasably engage the computer drive.

8. The carrier of claim 7, the second non-threaded engaging element being disposed on a first tongue of the first side rail, the first tongue being bendable to allow the second non-threaded engaging element to releasably engage the computer drive, and
   the fourth non-threaded engaging element being disposed on a second tongue of the second side rail, the second tongue being bendable to allow the fourth non-threaded engaging element to releasably engage the computer drive.

9. The carrier of claim 1, further comprising a second end element joining the first side rail and the second side rail.

* * * * *